May 10, 1932. J. J. SMITH 1,857,410
APPARATUS FOR OPERATING ON SPINNING FRAMES AND OTHER MACHINES
Filed Sept. 21, 1926 7 Sheets-Sheet 1
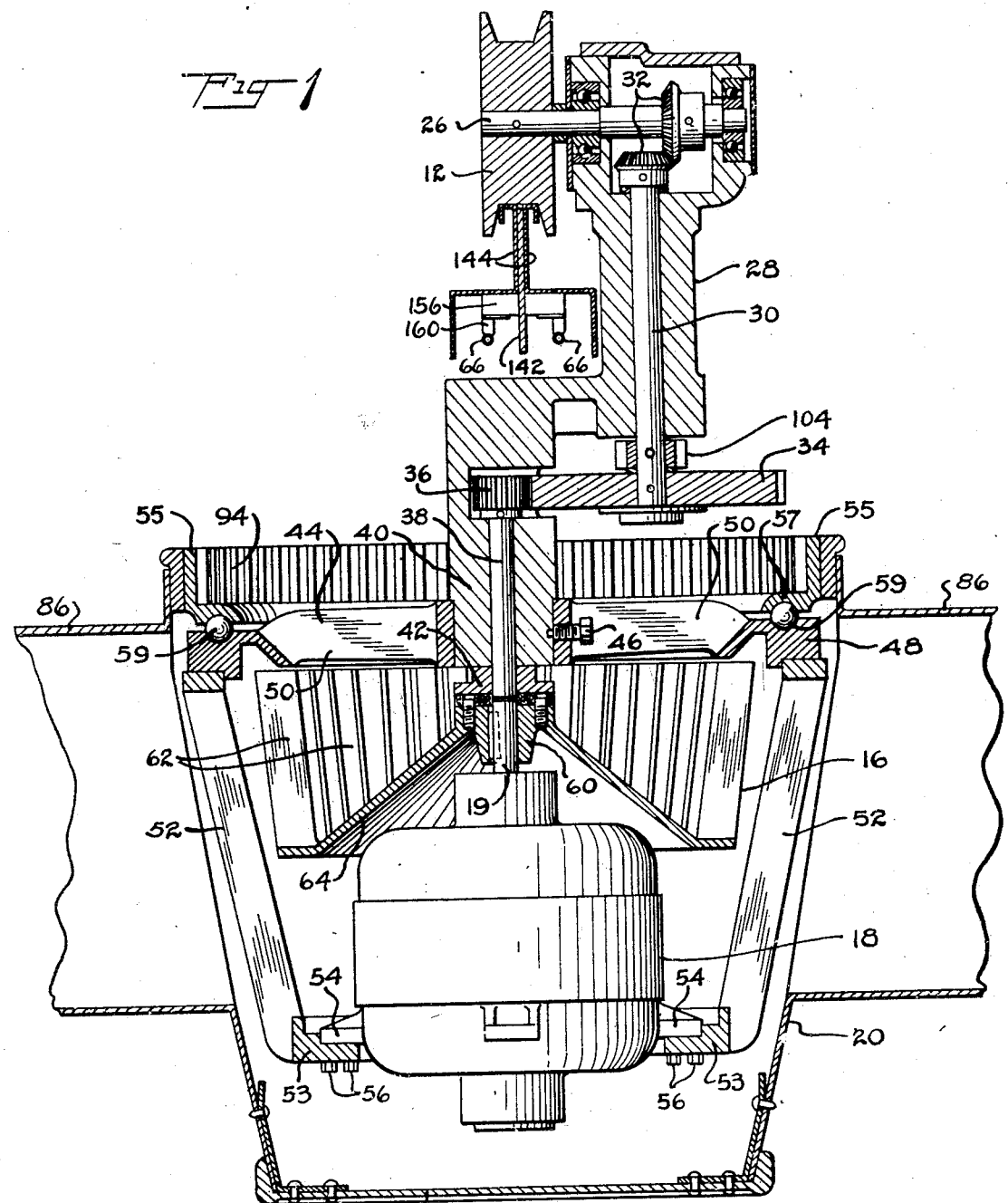
INVENTOR.
J. J. Smith
BY Bartlett Monroe
ATTORNEYS.

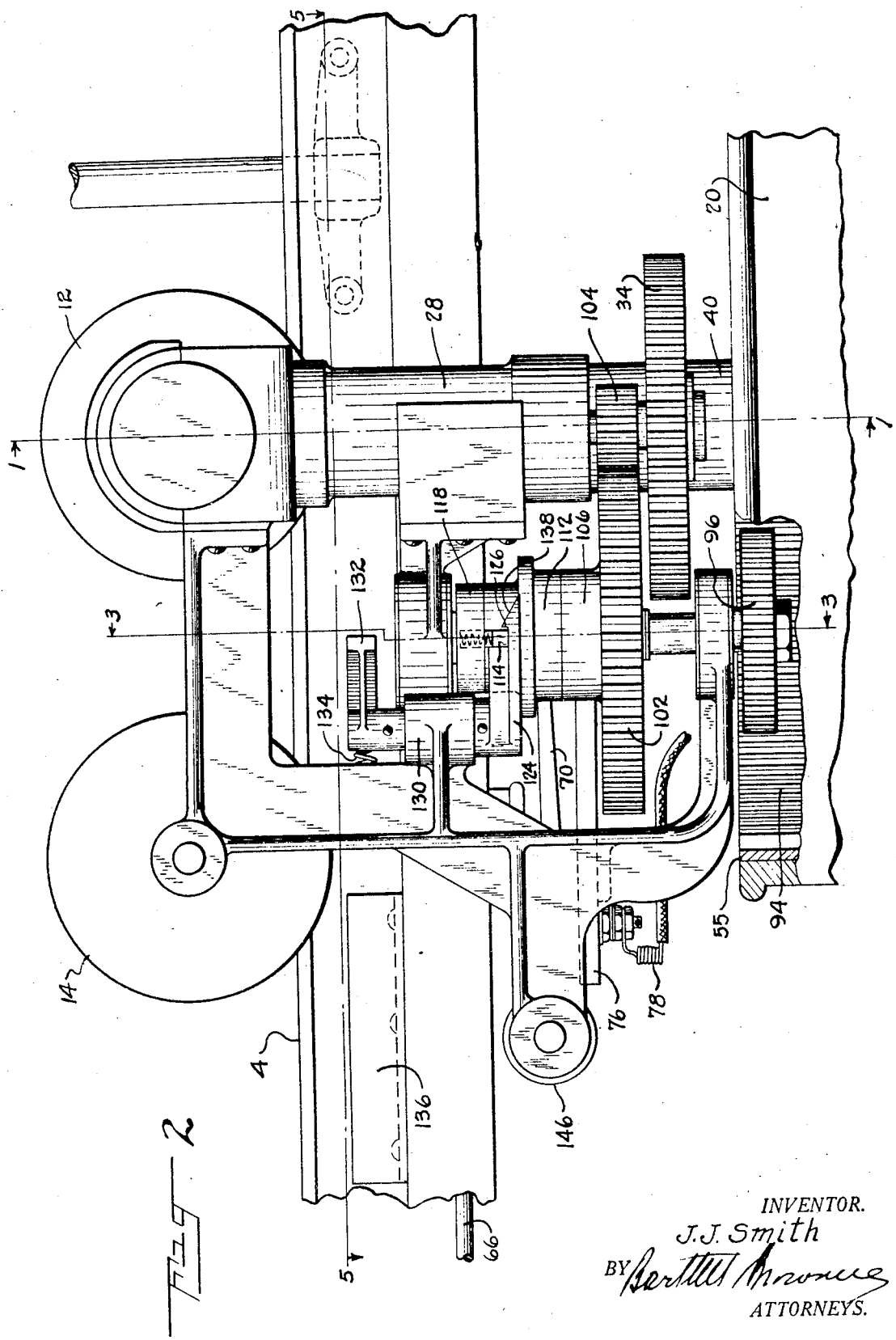

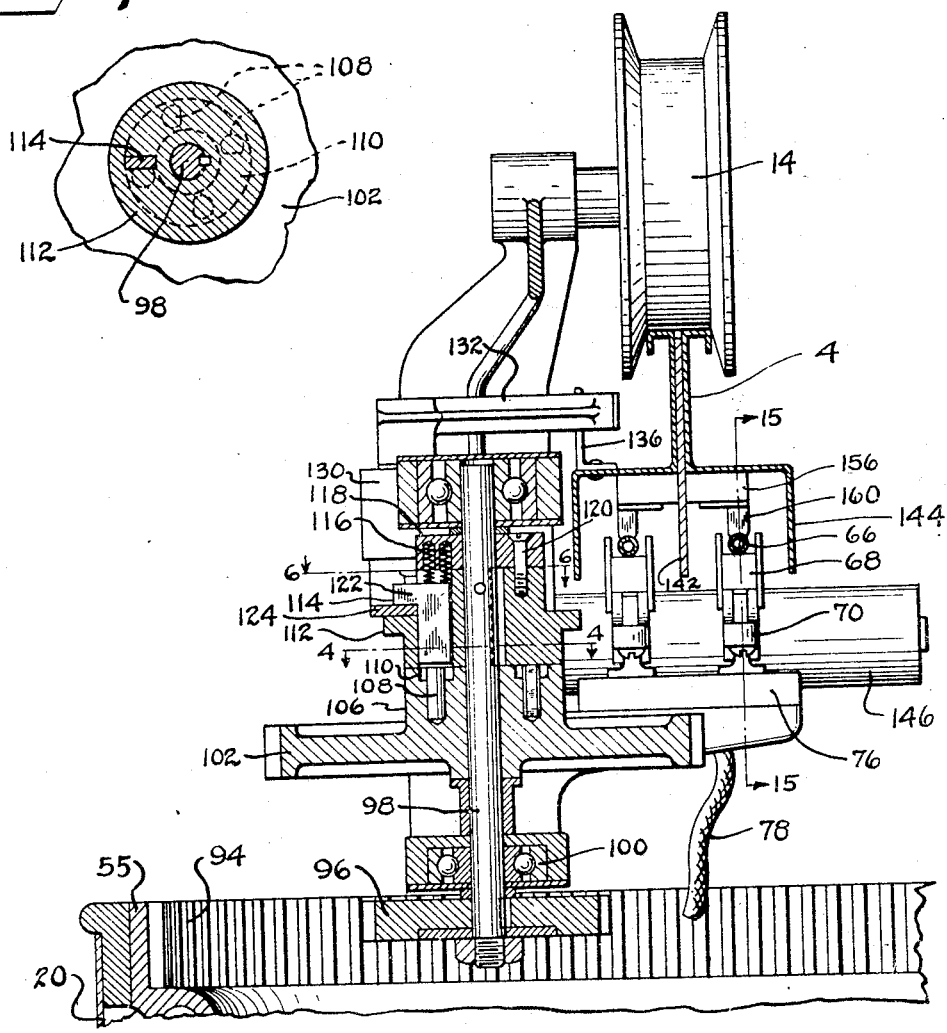

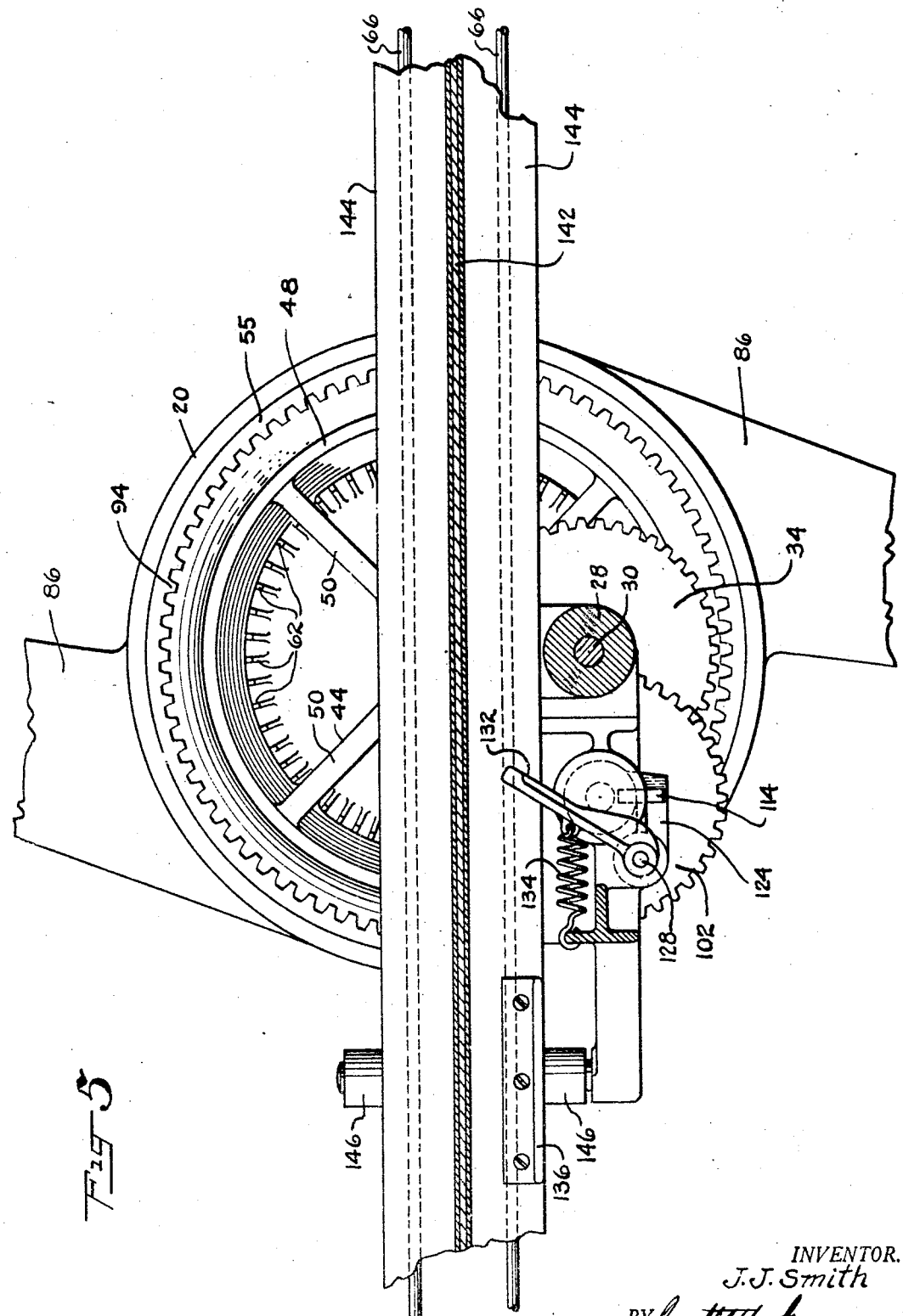

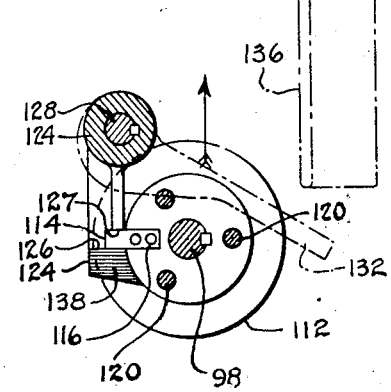
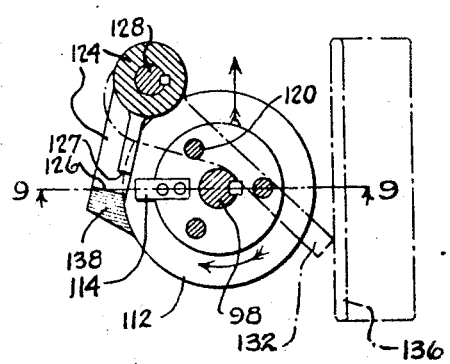
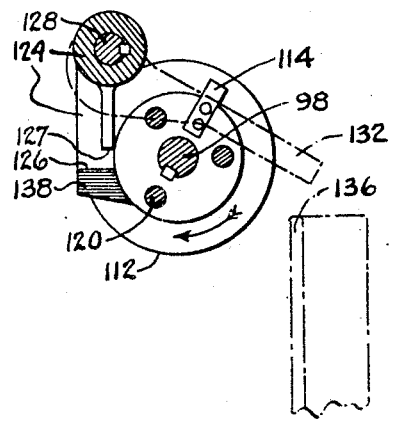
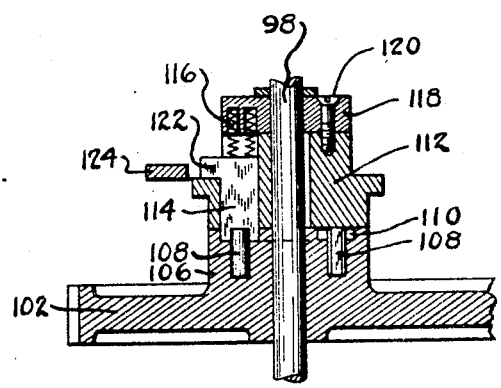
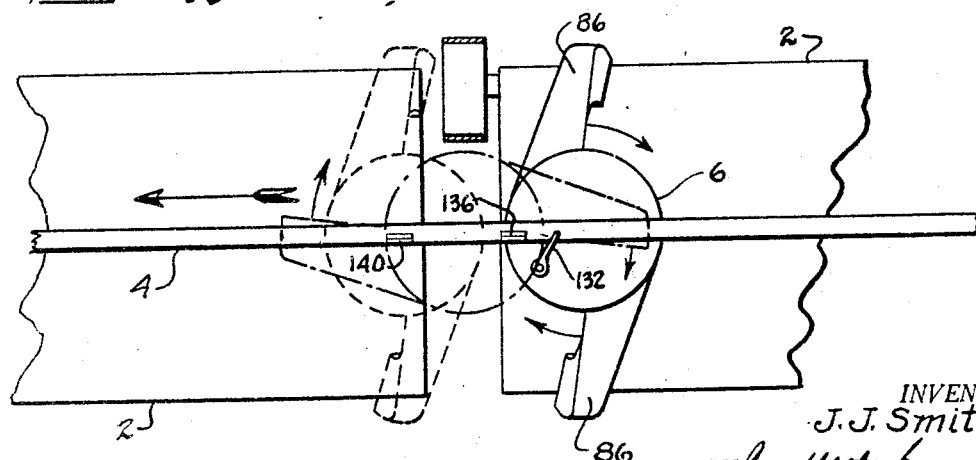

May 10, 1932.  J. J. SMITH  1,857,410
APPARATUS FOR OPERATING ON SPINNING FRAMES AND OTHER MACHINES
Filed Sept. 21, 1926    7 Sheets-Sheet 6
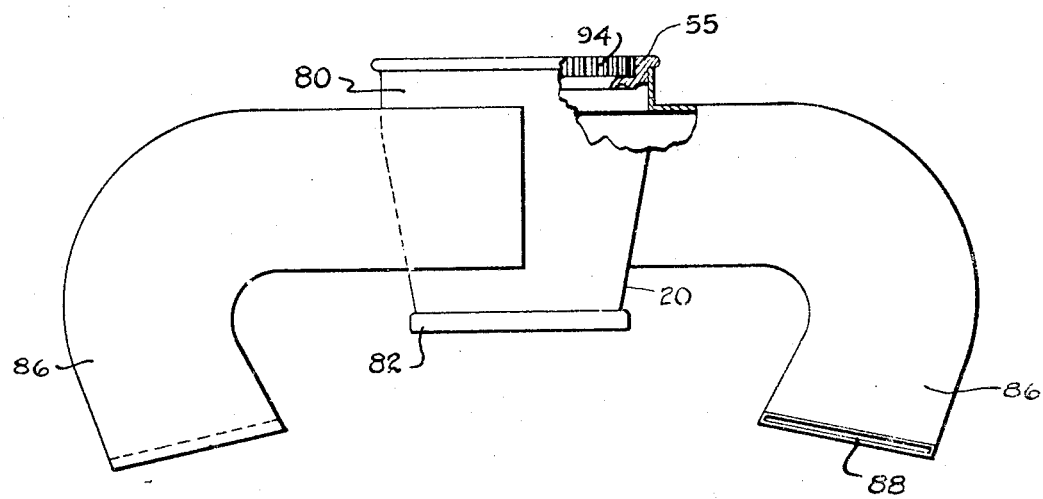
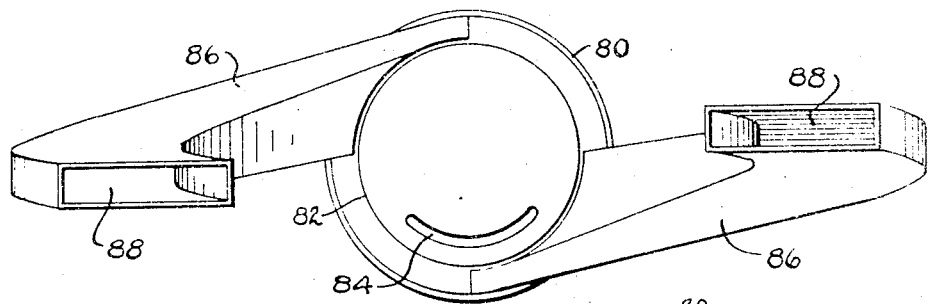
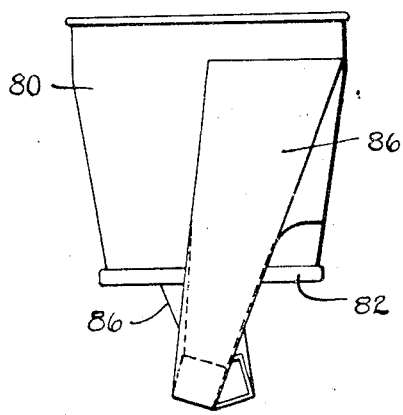
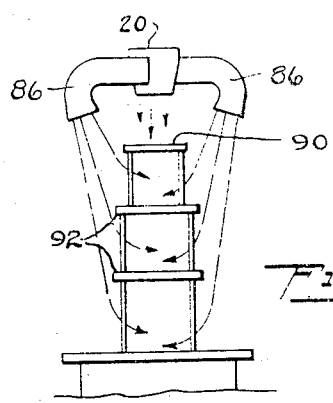
INVENTOR.
J. J. Smith
BY
ATTORNEYS.

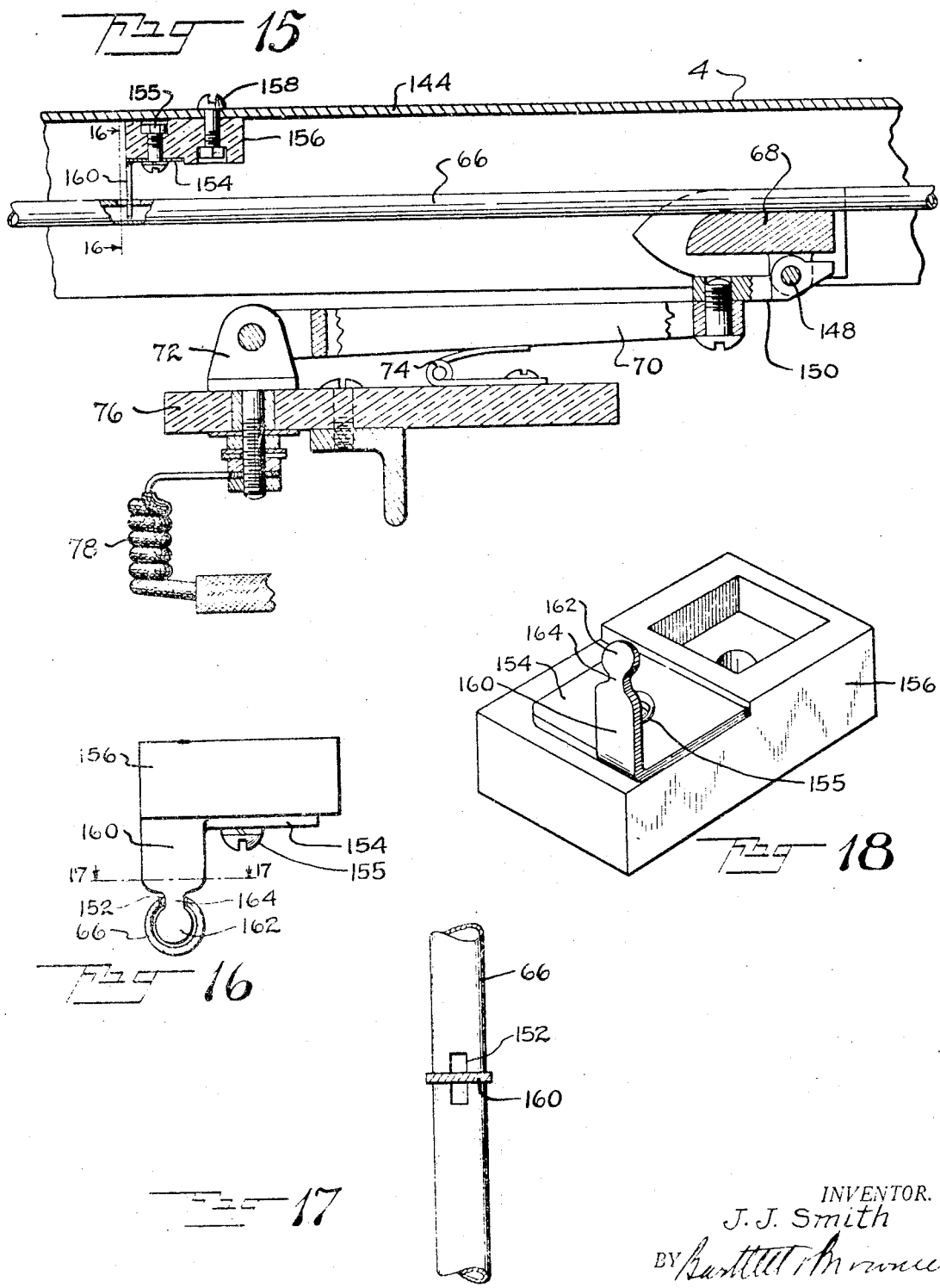

Patented May 10, 1932

1,857,410

UNITED STATES PATENT OFFICE

JOSEPH J. SMITH, OF CAMBRIDGE, MASSACHUSETTS; WILLIAM J. SMITH, EXECUTOR OF SAID JOSEPH J. SMITH, ASSIGNOR TO FIRTH-SMITH COMPANY, OF BOSTON, MASSACHUSETTS, A CORPORATION OF MASSACHUSETTS

APPARATUS FOR OPERATING ON SPINNING FRAMES AND OTHER MACHINES

Application filed September 21, 1926. Serial No. 136,772.

My invention relates to apparatus for operating upon spinning frames and other machines, and has special reference to apparatus which are adapted to direct air downwardly over the machines of a plurality of rows successively for the purpose of forcing loose fibers, lint and dust away from the work and toward the floor.

One of the objects of the invention is to provide a novel and improved apparatus of this character.

Apparatus of this character are provided with a relatively wide air directing means which travels widthwise so as to direct air downwardly over the machines throughout their width, and in order for such air directing means to pass driving belts and other obstructions in its path it is frequently necessary for it to be turned so as to travel endwise as it passes the obstructions. Another object of the present invention is to provide novel and improved means in an apparatus of this character for thus changing the position of the air directing means.

Another object of the invention is to provide novel and improved air directing means for an apparatus of this character.

Another object of the invention is to provide novel and improved means for supporting a tubular electrical conductor, which is particularly adapted for use in supporting the trolley wires for energizing the electric motor which is used in driving an apparatus of this character.

The several features of the invention whereby the above mentioned and other objects may be attained, will be clearly understood from the following description and accompanying drawings, in which:

Figure 1 is a transverse sectional view, partly in elevation and partly broken away, of an apparatus embodying features of the invention in their preferred form, the section being shown as taken on the line 1—1 of Fig. 2;

Fig. 2 is a side elevation on an enlarged scale of the upper portion of the apparatus;

Fig. 3 is a sectional view taken on the line 3—3 of Fig. 2;

Fig. 4 is a detail sectional view, taken on the line 4—4 of Fig. 3;

Fig. 5 is a sectional plan view taken on the line 5—5 of Fig. 2;

Fig. 6 is a detail sectional plan view taken on the line 6—6 of Fig. 3;

Figs. 7 and 8 are views similar to Fig. 6, but showing certain parts in different positions;

Fig. 9 is a sectional view taken on the line 9—9 of Fig. 7;

Fig. 10 is a plan view, partly diagrammatical, of the apparatus shown as operating upon a plurality of spinning frames or other machines, the air directing means of the apparatus being shown by full lines in one position and by broken lines in two other positions;

Fig. 11 is a detail side view, partly in section, of the air directing means of the apparatus;

Figs. 12 and 13 are bottom plan and end views, respectively, of the same;

Fig. 14 is a diagrammatical end view showing the air directing means of the apparatus operating upon a spinning frame or similar machine;

Fig. 15 is a longitudinal sectional view taken on the line 15—15 of Fig. 3, illustrating particularly the means for supporting the trolley wires through which the electric motor that drives the apparatus is energized;

Fig. 16 is a detail sectional elevation taken on the line 16—16 of Fig. 15;

Fig. 17 is a sectional plan view taken on the line 17—17 of Fig. 16; and

Fig. 18 is a detail view in perspective of one of the component parts of the trolley wire supporting means.

The apparatus illustrated in the drawings is of the type of the one described and claimed in the patent to William B. Walker, methods of and apparatus for operating on spinning frames and other machines, No. 1,781,142, dated November 11, 1930. This apparatus is particularly adapted for use in operating upon spinning frames, indicated at 2 in Fig. 10, which are usually arranged in parallel rows with the frames of each row arranged end to end. The apparatus is provided with an endless track 4 which extends centrally over the machines of each row. The air impelling device or blower 6 is mounted to travel along the track by power-operated means, so as to operate successively upon the machines of each row and upon the several rows of the machines successively, so that each machine is operated upon at predetermined intervals. The air impelling device or blower 6 is provided with a carriage having flanged wheels or sheaves 12 and 14 mounted upon the track, and is further provided with a fan 16 and an electric motor 18 having its shaft 19 arranged vertically. The motor 18, through suitable connections hereinafter described, drives the sheaf 12 so as to propel the blower along the track, and also drives the fan 16. The fan 16 and motor 18 are enclosed by a sheet metal casing 20 hereinafter described which is provided with suitable discharge orifices for directing currents of air downwardly over the spinning frames. The driving sheaf 12 is secured on one end of a horizontal shaft 26 which extends through and is journaled in suitable roller bearings in the bifurcated upper end of a vertically arranged post or hanger 28 forming a part of the blower carriage. The connection between the sheaf shaft 26 and the motor shaft 19 comprises a vertical shaft 30 which extends through a suitable bearing in the post or hanger 28, and has its upper end operatively connected with the shaft 26 through bevel gears 32. The lower end of the vertical shaft 30 carries a spur gear 34 which is operatively engaged by a pinion 36 secured on the upper end of a vertical shaft 38 that extends through and is journaled in a suitable bearing in a depending post or hanger 40 cast integral with the post or hanger 28. The vertical shaft 38 is in axial alinement with the motor shaft 19, and is connected therewith by means of a flexible coupling 42. The electric motor is supported on the hanger 40 by means of a suitable spider 44 which has its hub secured by a set-screw 46 to said hanger. The spider is provided with an outer annulus or rim 48 which is connected with the hub by a series of four radial arms 50, and is further provided with depending bracket arms 52 that are connected at their lower ends by an annulus 53 which supports lugs 54 projecting from the motor casing, the lugs being secured to the annulus 53 by bolts 56.

The upper annulus 48 of the spider supports the nozzle casing 20. To provide for this an annular member 55 is secured to the inside of the upper end of the casing and is provided with a horizontal inwardly directed flange 57 that extends over the outer portion of the annulus 48. The flange 57 and annulus 48 are provided with opposed annular grooves forming a raceway for ball bearings 59 so that the nozzle casing may be turned or swiveled about a vertical axis as hereinafter described.

The fan 16 is of suitable construction so as to direct the air downwardly through the casing 20. As shown, this fan is provided with a hub 60 which is secured on the upper end of the motor shaft 19, and is further provided with suitably formed blades 62 that are connected at their lower ends to an outwardly and downwardly flaring web 64 projecting from the fan hub 60.

To energize the electric motor 18, trolley wires 66 are mounted at opposite sides of the track 4. These trolley wires are engaged by trolleys 68 which are mounted on the free ends of arms 70 pivotally mounted on the upper ends of binding posts 72. Each trolley 68 is held upwardly in engagement with its wire by means of a suitably arranged spring 74. The binding posts 72 extend downwardly through apertures in a plate 76 of insulating material and are suitably secured therein. The lower ends of the binding posts 72 are electrically connected with the motor by means of conductors 78.

With this construction it will be apparent that upon the current through the trolley wires being turned on, the motor shaft will drive the fan, and also through its connection with the sheaf 12 will propel the blower continuously along the endless track and thus will cause the air from the blower to be directed successively over the machine of each row and over the several rows of machines successively.

Except as hereinafter described, the parts of the apparatus above referred to may be and preferably are the same as the corresponding parts of the apparatus illustrated and described in said patent to William B. Walker.

In my improved apparatus as illustrated in the drawings, the air directing casing 20 is so constructed as to cause the air to most effectively act upon the spinning frames or other machines (Figs. 11, 12 and 13). As shown, this casing is provided with a cylindrical portion 80 which closely surrounds the sides of the supporting frame for the motor and fan, and tapers downwardly slightly and has its lower end closed by a horizontal cover 82 which is spaced a distance below the lower end of the motor. This cover is provided with a centrally located arcuate slot 84 forming an air discharge orifice.

The casing 20 is further provided with laterally projecting arms 86 having their inner ends arranged opposite the fan and having their outer end portions inclined downwardly and inwardly. The opposite sides of each arm are inclined toward each other so as to provide a relatively long and narrow discharge orifice 88. The inner ends of the arms 86 are arranged at opposite sides of a vertical transverse diametrical plane of the cylindrical portion 80, and the outer ends of the arms are arranged at opposite sides of said plane so as to position the orifices 88 one in advance of the other.

With this construction, viewing Fig. 14, it will be apparent that the centrally located discharge orifice 84 will direct a current of air of suitable width downwardly upon the top shelf 90 of a spinning frame or other machine, and the discharge orifices 88 in the ends of the lateral arms of the casing will direct currents of air downwardly and inwardly over the sides of the machine. By arranging the lateral arms 86, as above described, with the orifices 88 arranged one in advance of the other, it will be apparent that the currents of air directed by the two arms, instead of meeting at the center of the shelves 92 of the spinning frame, or corresponding parts of other machines, pass each other and thus each will be free to sweep any deposits of dust or lint completely across the shelf and over the opposite edge of the shelf. With this arrangement of lateral air directing arms, all of the spindles or bobbins of the spinning frame, where the apparatus is used in connection with spinning frames, may be effectively operated upon.

Spinning frames and other machines are frequently driven by belts which pass over driving pulleys adjacent one end of the machines and over pulleys located a distance above the machines. In order for the relatively wide air directing means or nozzle casing 20 to pass by these belts or other obstructions in its path, it is necessary to turn the casing so as to cause it to pass endwise by the obstruction, and then after passing the obstruction to be returned to its initial position so as to operate properly on the next machine which it approaches. In my improved apparatus as illustrated in the drawings, the means for thus changing the position of the casing 20 comprises connections between the casing and the counter-shaft 30 through which the carriage wheel 12 is driven. This connection comprises a clutch which is adapted to be automatically controlled so that as the nozzle casing approaches the belt or other obstruction, it is caused to turn 90 degrees in one direction to position it endwise, and is maintained in that position until it substantially passes the obstruction when it is further turned 90 degrees in the same direction so as to return it to its normal widthwise position (Fig. 10). By thus turning the nozzle casing it will be apparent that the casing may closely approach one side of the obstruction, and then as it passes the obstruction may be repositioned widthwise close to the opposite side of the obstruction, which is advantageous as it permits the casing to properly position itself after passing a belt at one end of a machine before it reaches the opposed end of the next succeeding machine, thus insuring each machine being operated upon uniformly throughout its length.

As shown, the connection between the nozzle casing 20 and the counter-shaft 30 comprises an internal spur gear 94 which is formed on the supporting annulus 55 of the casing. This gear 94 is engaged by a spur gear 96 secured on the lower end of a vertical shaft 98, which is mounted to turn in roller bearings 100 secured on suitable brackets to the carriage frame. A large spur gear 102 is loosely mounted on the shaft 98 and is continuously driven by a pinion 104 secured on the shaft 30 that drives the carriage wheel 12. The shaft 98 is adapted to be connected with the gear 102 so as to be driven thereby by means of a one revolution clutch, the driving member of which is formed on the hub 106 of the gear 102 and comprises a series of pins 108 carried by the hub 106 and having their upper ends projecting into an annular groove 110 in the upper face of the hub. The driven member 112 of the clutch is secured to the shaft 98, and a detent 114 is mounted to slide in a vertical slot in the driven member. This detent is pressed downwardly by means of coiled springs 116 having their lower ends bearing on the upper end of the detent and their upper ends set in sockets in a cap or collar 118 which is secured by screws 120 to the upper end of the driven member 112. The upper end of the detent 114 is provided with an outwardly projecting tongue 122. During the normal operation of the apparatus with the nozzle casing 20 arranged widthwise of the machine, the tongue 122 rests upon the end of an arm 124 so as to position the lower end of the detent above the clutch pins 108, the tongue being held between shoulders 126 and 127 on the arm so as to positively hold the nozzle casing 20 in position (Fig. 2). The arm 124 is secured on the lower end of a rock-shaft 128 which extends through a vertical bearing 130 on the carriage frame. An arm 132 is secured on the upper end of the rock-shaft 128, and a coiled spring 134 is connected with this arm so as to tend to turn the rock-shaft 128 in a direction to hold the arm 124 inwardly against the driven member 112 of the clutch. An abutment plate 136 is secured on the track 4 in the path of the free end of the arm 132 and in proper position with relation to the belt or other obstruction in the path of the blower so that as the blower approaches the obstruction, the arm by engagement with the abutment plate is caused to swing in a direction to turn the rock-shaft 128 in a direction to swing the arm 124 outwardly from beneath the tongue 122 of the detent 114. When the detent 114 is thus released the springs 116 thereof force it downwardly into the path of one of the clutch pins 108, whereupon the pin by engagement with the lower end of the detent establishes driving connection between the gear 102 and the vertical shaft 98, which acts through the spur gear 96 and the internal gear 94 to turn the nozzle casing 20. The abutment plate 136 is of suitable length so that the arm 124 is held away from the driven member 112 of the clutch a sufficient length of time to insure the detent 114 dropping down into position to be engaged by one of the clutch pins 108, but before the driven member of the clutch has made one complete revolution, the arm 132 rides off of the abutment plate 136 and the coil spring connected with the arm acts through the rock-shaft 128 to swing the arm 124 inwardly so as to position its end in the path of the tongue 122 of the clutch detent. The free end of the arm 124 has an inclined face 138 so that upon engagement of the tongue of the detent with this inclined face, the tongue rides up on said face and snaps into locking position between the shoulders 126 and 127, thus throwing out the clutch and positively arresting the rotary movement of the nozzle casing. The gearing connection between the shaft 98 and the nozzle casing is such that upon each complete rotation of the driven member of the clutch, as above described, the nozzle casing is turned 90 degrees which changes the position of the casing from its widthwise to its endwise position. As the blower passes the belt or other obstruction, the end of the arm 132 engages a second abutment plate 140 which causes the arm to be swung in a direction to retract the arm 124 and thus permit the clutch to be thrown in so as to further rotate the nozzle casing 90 degrees to return it to its normal widthwise position, whereupon the clutch is again thrown out and the nozzle casing is held in this position by the engagement of the tongue of the clutch detent 114 between the locking shoulders on the arm 124.

Thus it will be apparent, by suitably positioning the abutment plates 136 and 140 adjacent opposite sides of the belt or other obstruction in the path of the blower, that the nozzle casing as it approaches close to the obstruction will be turned 90 degrees so as to position it endwise and as it passes the obstruction it will again be turned 90 degrees in the same direction so as to return it to its normal widthwise position, and that when it is in normal position it will be positively held from any turning movement, until the clutch is again thrown in.

In the apparatus illustrated in the drawings, the track upon which the blower runs comprises a steel strip 142, to the opposite sides of which are secured sheet metal members 144 which have their upper edges projecting a distance beyond the upper edge of the strip 142 and are bent outwardly and downwardly to form a substantially flat supporting surface for the flanged carriage wheels or sheaves 14. The lower portions of the sheet metal members 144 are bent outwardly horizontally and then downwardly, their lower edges being substantially in the plane of the lower edge of the strip 142. These lower portions of the members 144 cooperate with the lower portion of the strip 142 to form downwardly opening compartments or channels for the trolley wires 66, and preferably the walls of these channels are coated with insulating paint or other material.

The carriage frame is provided with a laterally projecting roller 146 (Figs. 2 and 5) which is secured on a bracket arm projecting from the carriage frame, and extends beneath the lower edges of the steel supporting strip 142 and the sheet metal members 144, the roller being spaced a slight distance beneath said edges. This roller 146 serves to prevent the carriage wheels from jumping off the track, and also obviates any danger of the trolley supporting arm or any other part of the apparatus striking the trolley wires.

Each of the trolleys 68 (Fig. 15) is in the form of a grooved shoe which is pivotally mounted on a horizontal pin 148 on one end of an arm 150 which is pivotally mounted to turn about a vertical axis on the rear end of the trolley supporting arm 70, such mounting of the trolley shoe permitting it to readily adjust itself to the trolley wire.

It has been a serious problem in apparatus of this character to properly support the trolley wires so as to obviate any danger of sparking. As these apparatus are used in spinning rooms and other parts of a textile mill where there is more or less cotton fiber or lint floating in the air, any sparking occurring between the trolleys and trolley wires would be objectionable. It has been found that no support for the trolley wires would be suitable which caused any projection on the trolley wires that might be engaged by the trolleys, as such projection would be liable to cause sparking, it being very essential that the surface of the wires engaged by the trolleys shall be smooth and uninterrupted. The means illustrated in the drawings for supporting the trolley wires has been found very satisfactory and to meet all requirements. As shown, the trolley wires are of tubular form, and at the points where it is desired to support them, each is provided with an elongated slot 152 in the top thereof. The support for each wire comprises a member of sheet metal having a horizontal base portion 154 which is secured by a screw or bolt 155 to the under side of a block 156 of insulating material that is secured to the under side of the horizontal lower portion of the sheet metal member 144 by means of a screw or bolt 158. A tongue 160, integral with the base portion 154, extends downwardly therefrom and its lower end is provided with a substantially circular head 162 and a reduced neck portion 164. The circular head 162 is of slightly less diameter than the inner diameter of the tubular conductor 66, and the neck portion 164 is of slightly less width than the width of the slot 152, so as to permit the head 162 to be inserted through the slot 152 and then turned to position it cross-wise of the conductor, with the neck portion 164 extending across the slot 152. The tongue 160 is located at one side of the longitudinal center line of the block 156 so as to permit the block to be positioned against the side of the track supporting strip 142 with the conductor centrally located between the strip and the adjacent depending portion of the sheet metal member 144, and also to permit the bolt 158 to be readily inserted to secure the block in position after the tongue 160 has been inserted in the tubular conductor and turned so as to position it in holding position.

By utilizing a suitable number of these supports for each conductor, it will be apparent that the conductor may be securely held. The circular head 162 which substantially fits the inner wall of the conductor and the neck portion 164 which is of substantially the width of the slot 152, securely holds the conductor in proper position. Also the elongated slots 152 permit the conductor to be mounted without accurate adjustment of the parts of the supports with relation to the slots in the conductor, and also they permit a certain amount of longitudinal movement of the conductor to take care of expansion and retraction. It will also be apparent that the parts of the supports for the conductors are well out of the path of the trolleys so that there is no danger of the trolleys striking them.

As will be evident to those skilled in the art, my invention permits various modifications without departing from the spirit thereof or the scope of the appended claims.

What I claim is:

1. Apparatus of the class described having, in combination, an overhead track, a blower mounted to travel along the track, relatively wide air directing means for said blower to direct air downwardly normally extending transversely of the direction of travel of said blower, and means for turning said air directing means in one direction to cause it to extend longitudinally of said direction of travel so as to permit it to clear an obstruction in its path and for further turning it in the same direction to return it to its normal position as it passes said obstruction.

2. Apparatus of the class described having, in combination, an overhead track, a blower mounted to travel along the track, air directing means associated with said blower for directing air downwardly as the blower travels along the track, and means for turning said air directing means in one direction about a substantially vertical axis at a predetermined point in its travel, maintaining it in the position turned for a predetermined distance, and then further turning it in the same direction to return it to its initial angular position, the air directing means being longer in the direction transverse to the track than in the direction parallel to the track.

3. Apparatus of the class described having, in combination, an overhead track, a blower mounted to travel along the track, air directing means associated with said blower for directing air downwardly, means for turning said air directing means in one direction about a substantially vertical axis substantially 90 degrees at a predetermined point in its travel, maintaining it in the angular position thus turned for a predetermined distance and then turning it substantially another 90 degrees in the same direction, the air directing means being longer in the direction transverse to the track than in the direction parallel to the track.

4. Apparatus of the class described having, in combination, an overhead track, a carriage mounted to travel along the track, a blower mounted on said carriage, air directing means associated with said blower for directing air downwardly, an electric motor mounted on the carriage, connections between the motor shaft and said air directing means for turning said means about a substantially vertical axis, and means for rendering said connections operative and inoperative at predetermined intervals to thus turn said air directing means, the air directing means being longer in the direction transverse to the track than in the direction parallel to the track.

5. Apparatus of the class described having, in combination, an overhead track, a carriage mounted to travel along the track, a blower mounted on said carriage, air directing means associated with said blower for directing air downwardly, an electric motor mounted on the carriage, connection with the shaft of said motor for driving the carriage along the track, connection between the shaft of said motor and said air directing means for turning said means about a substantially vertical axis, and means for rendering said last-mentioned connection operative and inoperative at predetermined points in the travel of said carriage to thus turn said air directing means, the air directing means being longer in the direction transverse to the track than in the direction parallel to the track.

6. Apparatus of the class described having, in combination, an overhead track, a carriage mounted to travel along the track, a blower mounted on said carirage, air directing means associated with said blower for directing air downwardly, an electric motor mounted on the carriage, connection with said motor shaft for driving the blower, connection with said motor shaft for driving said carriage along the track, connection between said motor shaft and said air directing means for turning said means about a substantially vertical axis, and means for rendering said last-mentioned connection operative and inoperative at predetermined points in the travel of said carriage to thus turn said air directing means, the air directing means being longer in the direction transverse to the track than in the direction parallel to the track.

7. Apparatus of the class described having, in combination, an overhead track, a carriage mounted to travel along the track, a blower mounted on said carriage, air directing means associated with said blower for directing air downwardly, an electric motor mounted on the carriage, connections between the motor shaft and said air directing means for turning said means about a substantially vertical axis, comprising a clutch having a control element acting when moved in one direction to render said connections operative to turn said air directing means, and a member arranged in the path of said control element for causing said element upon engagement therewith to be moved in said direction, the air directing means being longer in the direction transverse to the track than in the direction parallel to the track.

8. Apparatus of the class described having, in combination, an overhead track, a carriage mounted to travel along the track, a blower mounted on said carriage, air directing means associated with said blower for directing air downwardly, an electric motor mounted on the carriage, connections between the motor shaft and said air directing means for turning said means about a substantially vertical axis, comprising a clutch having a control element acting when moved in one direction to render said connections operative to turn said air directing means and when moved in the opposite direction to render said connections inoperative, a member arranged in the path of said control element for causing said element upon engagement therewith to be moved in said first-mentioned direction, and means for moving said element in the opposite direction upon passing said member, the air directing means being longer in the direction transverse to the track than in the direction parallel to the track.

9. Apparatus for operating upon a spinning frame or other machine having, in combination, an overhead track, a blower mounted on the track to travel over the machine, and air directing means associated with said blower having a discharge orifice for directing air downwardly over the top of the machine and having laterally arranged discharge orifices suitably inclined to direct air downwardly and inwardly over the sides of the machine.

10. Apparatus for operating upon a spinning frame or other machine having, in combination, an overhead track, a blower mounted on the track to travel over the machine, and air directing means associated with the blower having laterally arranged discharge orifices suitably inclined to direct air downwardly and inwardly over the sides of the machine.

11. Apparatus for operating upon a spinning frame or other machine having, in combination, an overhead track, a blower mounted on the track to travel over the machine, and air directing means associated with the blower having laterally arranged discharge orifices suitably inclined to direct air downwardly and inwardly over the sides of the machine, said orifices being out of alinement to each other so as to direct separate currents of air, one past the other.

12. Apparatus for operating upon a spinning frame or other machine having, in combination, an overhead track, a blower mounted on the track to travel over the machine, and air directing means associated with the blower having laterally arranged discharge orifices suitably inclined to direct air downwardly and inwardly over the sides of the machine, said orifices being arranged one in advance of the other during the normal travel of the blower so as to direct separate currents of air past each other.

13. Apparatus for operating upon spinning frames or other machines arranged in a row having, in combination, an overhead track, a blower mounted on the track to travel over the machines in the row, and air directing means associated with the blower comprising a central casing having an orifice for directing air downwardly over the tops of the machines, and arms extending laterally from said casing having orifices in their ends suitably arranged to direct air downwardly and inwardly over the sides of the machines.

14. Apparatus for operating on spinning frames or other machines having, in combination, an overhead track, a blower mounted on the track to travel over the machines, and air directing means associated with the blower having discharge orifices arranged laterally with relation to the normal path of travel of the blower for directing air downwardly and inwardly over the sides of the machine, said orifices being out of alinement to each other so as to direct separate currents of air past each other.

In testimony whereof, I have signed my name to this specification this 2nd day of September, 1926.

JOSEPH J. SMITH.